US009547143B2

(12) United States Patent
Fredrick et al.

(10) Patent No.: US 9,547,143 B2
(45) Date of Patent: Jan. 17, 2017

(54) FIBER OPTIC LASER ALIGNMENT TOOL

(71) Applicant: Laser Mechanisms, Inc., Novi, MI (US)

(72) Inventors: William G. Fredrick, Northville, MI (US); Tom R. Kugler, Williamston, MI (US); Dan R. Buckley, Canton, MI (US); Ruchira D. Perera, Wixom, MI (US); Gerry F. Hermann, Westland, MI (US); Scott D. Swartzinski, Plymouth, MI (US); Mark J. Taggart, Troy, MI (US)

(73) Assignee: LASER MECHANISMS, INC., Novi, MI (US)

( * ) Notice: Subject to any disclaimer, the term of this patent is extended or adjusted under 35 U.S.C. 154(b) by 59 days.

(21) Appl. No.: 14/273,571

(22) Filed: May 9, 2014

(65) Prior Publication Data

US 2015/0286020 A1 Oct. 8, 2015

Related U.S. Application Data

(60) Provisional application No. 61/821,445, filed on May 9, 2013.

(51) Int. Cl.
| | |
|---|---|
| *G02B 6/26* | (2006.01) |
| *G02B 6/42* | (2006.01) |
| *B23K 26/04* | (2014.01) |
| *G02B 6/38* | (2006.01) |

(52) U.S. Cl.
CPC ............. *G02B 6/4296* (2013.01); *B23K 26/04* (2013.01); *G02B 6/262* (2013.01); *G02B 6/3813* (2013.01); *G02B 6/4225* (2013.01); *G02B 6/4234* (2013.01)

(58) Field of Classification Search
None
See application file for complete search history.

(56) References Cited

U.S. PATENT DOCUMENTS

| | | | | |
|---|---|---|---|---|
| 4,812,641 A | * | 3/1989 | Ortiz ..................... | G01M 11/35 219/121.62 |
| 4,868,361 A | * | 9/1989 | Chande et al. .......... | G02B 6/32 219/121.62 |
| 5,179,610 A | * | 1/1993 | Milburn et al. ...... | G02B 6/3813 385/147 |
| 5,319,195 A | * | 6/1994 | Jones et al. .......... | B23K 26/032 219/121.62 |
| 5,463,215 A | * | 10/1995 | Alfille .................... | G01B 11/26 219/121.78 |
| 5,463,710 A | * | 10/1995 | Filgas et al. .......... | G02B 6/4225 385/44 |
| 2006/0013532 A1 | * | 1/2006 | Wan ....................... | B23K 26/03 385/31 |
| 2011/0305249 A1 | * | 12/2011 | Gapontsev et al. . | B23K 26/043 372/6 |

FOREIGN PATENT DOCUMENTS

DE 102007048471 * 4/2009

* cited by examiner

*Primary Examiner* — Mike Stahl
(74) *Attorney, Agent, or Firm* — Harness, Dickey & Pierce, P.L.C.

(57) ABSTRACT

A method and apparatus are disclosed for aligning the coupling an optical laser fiber using an alignment structure. The disclosed alignment structure accepts an optical fiber having a beam and a detection apparatus. According to one aspect of the teachings, the detection apparatus has a tapered form having a circular cross section at one end to match the laser aperture, and a circular cross section at the other end to match the fiber core.

20 Claims, 5 Drawing Sheets

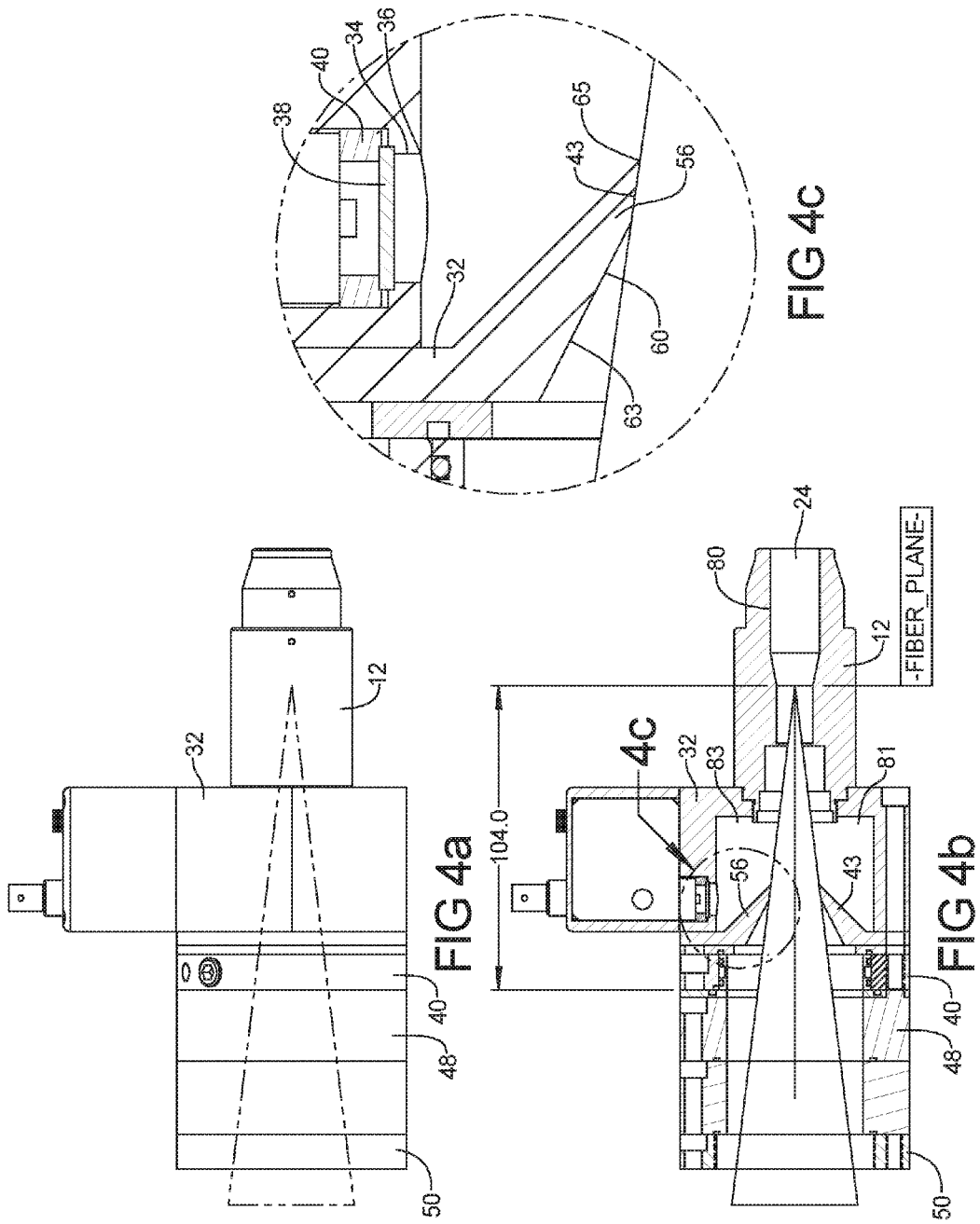

FIBER OPTIC LASER ALIGNMENT TOOL

CROSS-REFERENCE TO RELATED APPLICATIONS

This application claims the benefit of U.S. Provisional Application No. 61/821,445, filed on May 9, 2013. The entire disclosure of the above application is incorporated herein by reference.

FIELD

The present disclosure relates to the coupling of optical fibers with a laser cutting head and, more particularly, to a method and alignment apparatus for coupling a multimode fiber to the cutting head.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A number of coupling techniques have been developed to efficiently couple power between optical fibers and optical devices, especially between a semiconductor laser and an optical fiber, in optical communications and industrial laser systems. For example, proper alignment allows an increase in the coupling efficiency and, thus, a decrease in the coupling loss between the laser and the fiber or receiver, permit an increase in fiber output. However, efficient coupling of semiconductor lasers to optical fibers has been a problem of general concern since the advent of optical fiber laser transmission. Generally, as a result of coupling inefficiencies, a percentage of the laser output is not utilized. Thus, the laser has to be run at a correspondingly higher current to yield the same-coupled power into fiber that a more efficient coupling scheme could provide. In addition, operation of the laser at higher currents results in greater heat to be dissipated and raises questions of long term stability and reliability of the laser itself. As laser-cutting heads can need repair or replacement, realignment of the laser head to the transmission optical fiber with the optical lenses in the laser head is necessary. Typically, power meters are coupled to a laser head optics that attempt to allow maximization of the output of the system caused by proper laser to fiber input coupling. Because of the nature of industrial lasers, power measurement in a working environment may not be the best measure of fiber alignment.

SUMMARY

This section provides a general summary of the disclosure, and is not a comprehensive disclosure of its full scope or all of its features.

Generally, a method and apparatus are disclosed for coupling an optical laser fiber using an alignment structure. The disclosed alignment structure accepts an optical fiber having a beam and provides a detection apparatus. According to one aspect of the teachings, the detection apparatus has a tapered form having a circular cross section at one end to match the laser aperture, and a circular cross section at the other end to match the fiber core. An optical detector is provided which senses the amount of light that does not pass through the aperture, and is thus reflected to the optical detector.

According to the present teachings, an alignment structure for a laser cutting head is disclosed. The alignment structure has an optical detector that detects misalignment of a beam supplying fiber. The detector defines a reflective cone having a beam accepting through bore. The optical detector provides a signal indicative of light reflected off the reflective cone.

According to another teaching, a method for improving the alignment of a laser with a fiber is disclosed. The method includes positioning a laser with a first end of a fiber optic cable. An alignment detector is placed at a second end of the fiber optic cable. A first portion of collimated light transmitted through the fiber optic cable is passed through an aperture defined by the detector. A second portion of the collimated light is reflected within the alignment detector. An optical sensor within the alignment detector produces a signal indicative of the second portion of collimated light. The alignment of the laser with the first end of the fiber is then adjusted to minimize the second portion of collimated light.

Further areas of applicability of the present disclosure will become apparent from the detailed description, the claims and the drawings. The detailed description and specific examples are intended for purposes of illustration only and are not intended to limit the scope of the disclosure.

DRAWINGS

The drawings described herein are for illustrative purposes only of selected embodiments and not all possible implementations, and are not intended to limit the scope of the present disclosure.

FIGS. 4A-4C illustrate the fiber alignment structure shown in FIGS. 1-3; and

Corresponding reference numerals indicate corresponding parts throughout the several views of the drawings.

DETAILED DESCRIPTION

Figure 1:
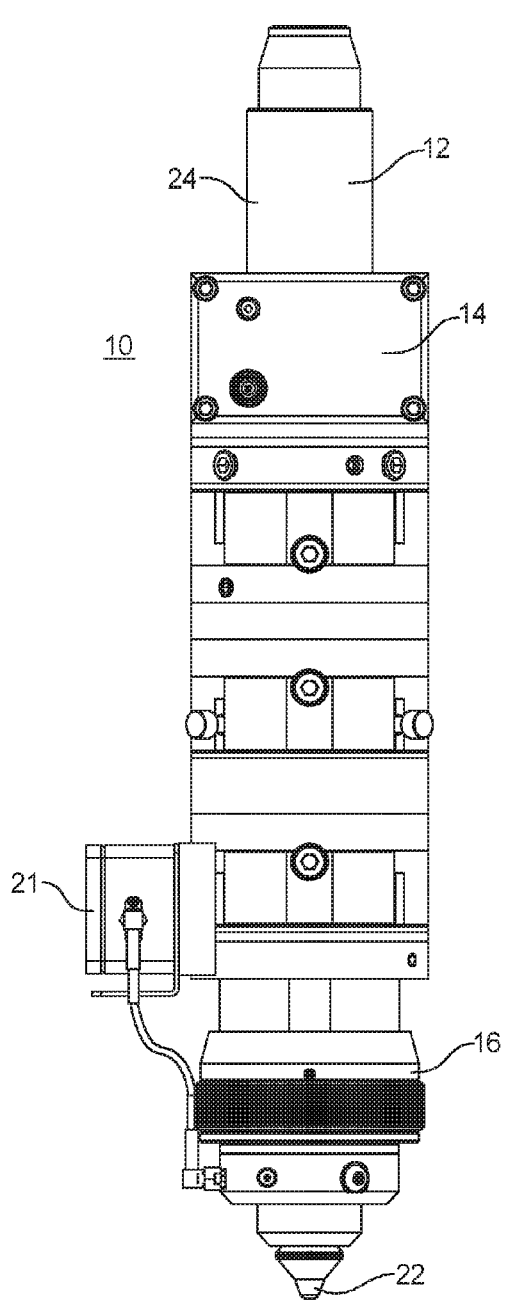
FIG. 1 illustrates an illustrative laser head accordance with the present teachings.
Figure 2:
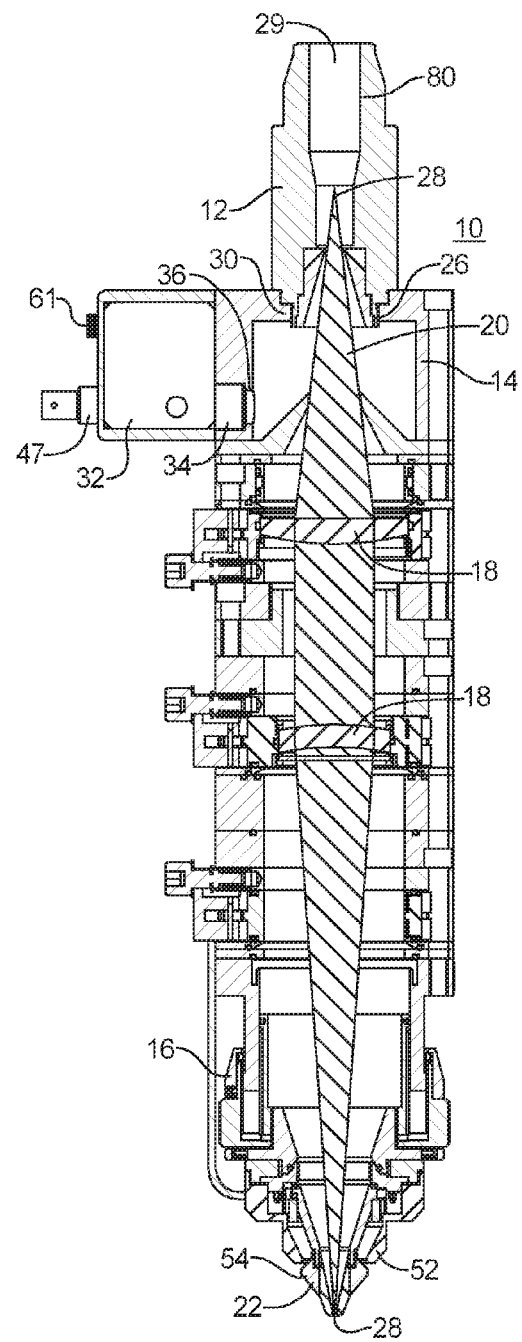
FIG. 2 illustrates a sectional view of the laser head according to the present teachings.

As shown in FIGS. 1-4C, the fiber coupling alignment system 10, according to the present teachings, has a fiber coupler 12, an alignment fixture 14, and laser head 16. The laser head 16 contains focusing optics 18 configured to focus a laser beam 20 from the fiber coupler 12 onto a work piece (not shown). The laser head 16 further has an atmospheric control 21 that is configured to supply inert gas into the laser head 16 and beam nozzle 22, as described in detail below. The laser head 16 can be aligned with the alignment fixture 14 and fiber coupling alignment system 10 to maximize the output of the alignment system 10.

Figure 3:
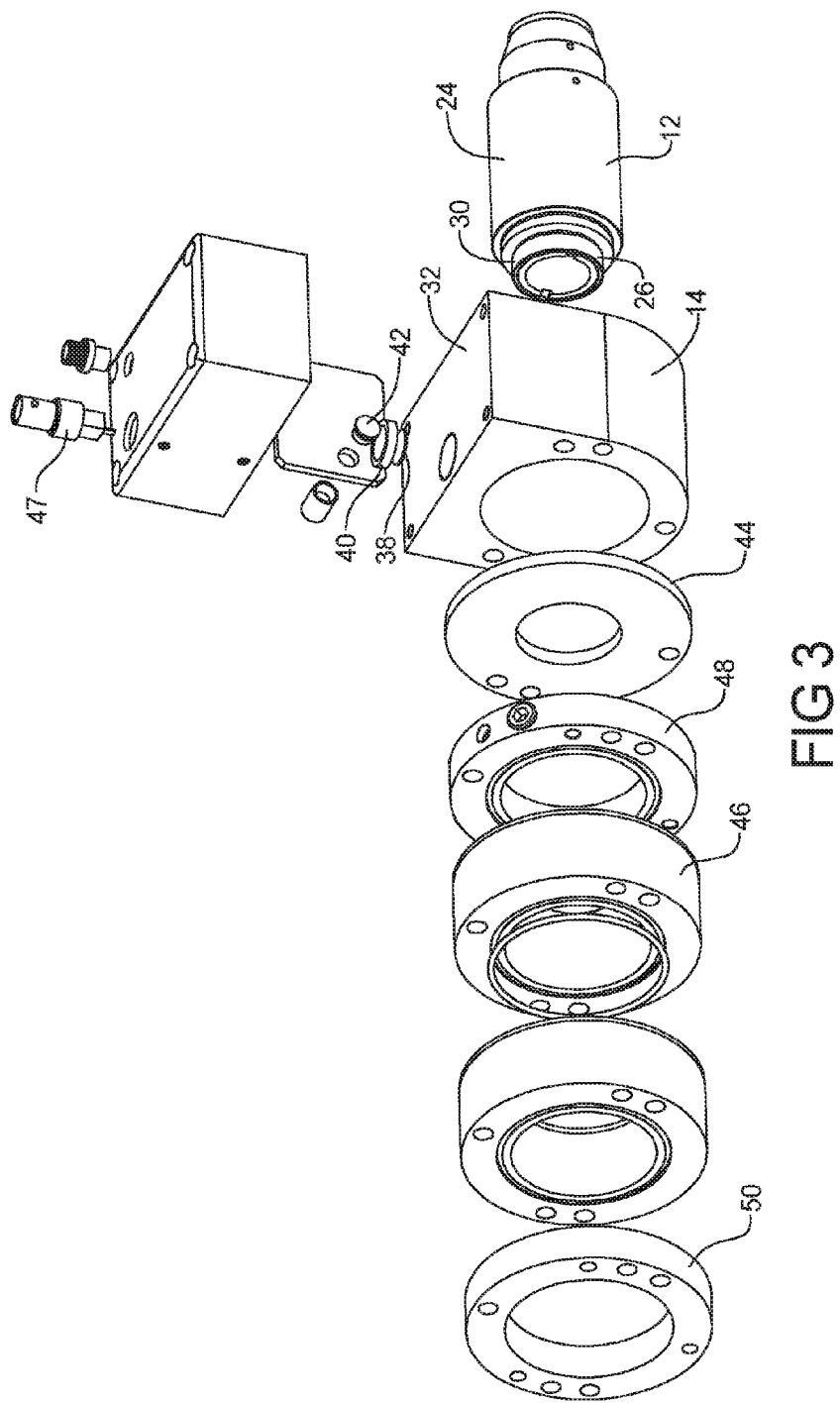
FIG. 3 illustrates an exploded view of a fiber alignment feature according to the present teachings.

FIG. 3 represents an exploded view of the alignment fixture 14 according to the present teachings. The alignment fixture 14 has a fiber interface assembly 24 defining a through bore or aperture 26, configured to accept the core of a fiber optic transmission line or cable. The alignment fixture 14 is configured to align the fiber so that the fiber optic cable produces a diverging beam.

The laser head focusing optics 18 function to focus the diverging beam into an adjustable focal point 28. The interface assembly 24 has a coupling end 30 which is threaded and configured to be selectively and fixably coupled to the alignment fixture 14. The alignment fixture 14 has a housing 32 and a beam monitor 34. The beam monitor 34 is coupled to a housing detection aperture 36 defined in the housing 32. The housing detection aperture 36 contains a filter 38 which can be held onto the housing 32 using a filter-retaining nut 40. A panel lens 42 allows for the observation of light reflected within the housing 32 from a non-aligned laser beam from being detected.

The alignment fixture 14 has a plurality of mechanisms that allow the adjustable coupling of the alignment fixture 14 to the laser head 16, or as described below a power meter 47 or black body. The mechanism includes an aperture plate 44, space blocks 46, 48, and an adapter block 50. It is envisioned dimensional adjustment can occur by adjusting X-Y-Z parameters of the fiber core with respect to the aligned apertures.

FIGS. 4B and 4C represent sectional views of the alignment fixture 14 according to the present teachings. As shown, the fiber coupler 12 is mated to the aperture in the housing 32. This generally aligns the beam from the fiber with the iris 43 of the alignment system 10. Shown in this particular configuration, the iris 43 can have a fixed through aperture. It is contemplated however that the iris 43 can have a variable sized through aperture. In the fixed iris configuration, the iris 43 can be formed at the apex of a cone 56 and define a cone aperture 54.

As best seen in FIG. 4C, the alignment fixture iris 43 has a conical aperture member 56. The conical aperture member 56 defines a bore which is aligned with the housing through-bore. The bore can be tapered on a first side so as to have an angle of inclination substantially equal to the divergence angle of the beam or the conical aperture member 56. The conical aperture member 56 has a tip portion 65 that defines a circular interface between the first concave interior side and an angled exterior convex second side 63. The angled exterior convex second side, 63 reflects the laser beam around the interior chamber defined by the alignment tool when the laser is misaligned with the first end of the fiber optic cable.

The fiber alignment system 10 for coupling the optical fiber 80 to a laser has, a laser producing a collimated beam adjustably coupled to a first end of a fiber optic cable. As described above, should the alignment be not proper, output of the laser system can be compromised. The alignment fixture is coupled to a second end of the fiber optic cable. As described above, the alignment fixture 14 defines a chamber 81 having a through aperture 83 aligned with the fiber 80. The alignment fixture 14 has a light detector 60 configured to detect reflected light within the chamber 81 caused by misalignment of a laser beam passing through the aperture 83. An internal iris 43 within the chamber is aligned with the through aperture 83 of the chamber 81.

The iris 43 can be defined within a cone having an exterior convex conical surface. The exteriors conical surface functions as a non-concentrating reflective layer that serves to allow the light detector to measure light being reflected within the chamber. The convex surface need not be highly polished, as the intent of the light detector is to produce a signal indicative of the amount of light in the chamber. Optionally, the iris 43 comprises and an interior concave conical surface. The intent of the interior concave surface is to not interfere or cause reflection of the light properly passing through the iris aperture. It is optional for instance for this interior surface to be cylindrical. The iris 43 can have a tapered surface on a first interior side having an angle of inclination substantially equal to a beam divergence angle. In this regard, the iris 43 can have a tip portion 65 that defines a circular interface between the interior concave surface and the exterior convex surface. The iris 43 the aperture is configured so as that when the beam is properly aligned, iris 43 defines an air gap between the beam and the interior or exterior conical surfaces.

The aperture is configured so as that when the beam is properly aligned, the conical aperture member will define an air gap between the beam and any internal or external surface. The alignment system 10 is used to align the laser beam with the through aperture of the alignment fixture 14 and laser head 16. When the originally misaligned beam is turned on, the dispersed beam engages the conical aperture member 56. Light from the non-aligned beam is reflected around the interior of the housing 32. The reflected beam passes through the filter 38 and housing detection aperture 36. At this point an optical detector determines how much of the beam has been misaligned. An operator can use set-screws to adjust the position of the beam with respect to the reflective cone 56 to minimize the amount of light not passing through the reflective cone 56.

Figure 5A:
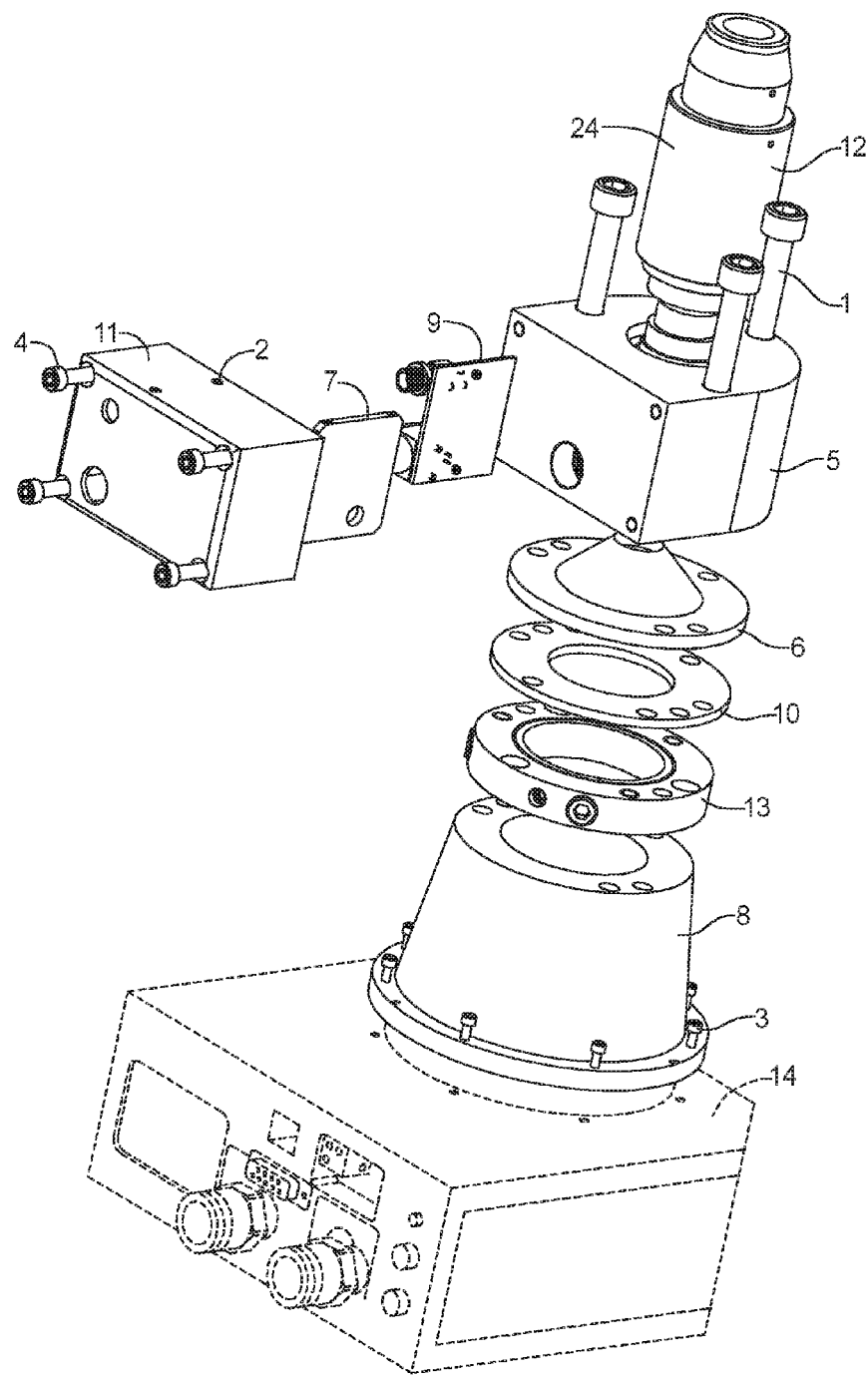
FIGS. 5A-5C represent an alignment tool according to alternate teaching.
Figure 5C:
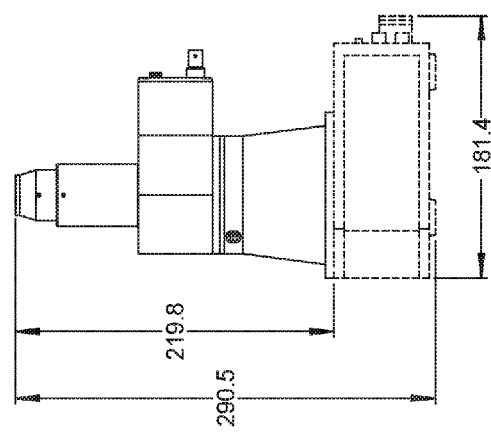
Figure 5B:
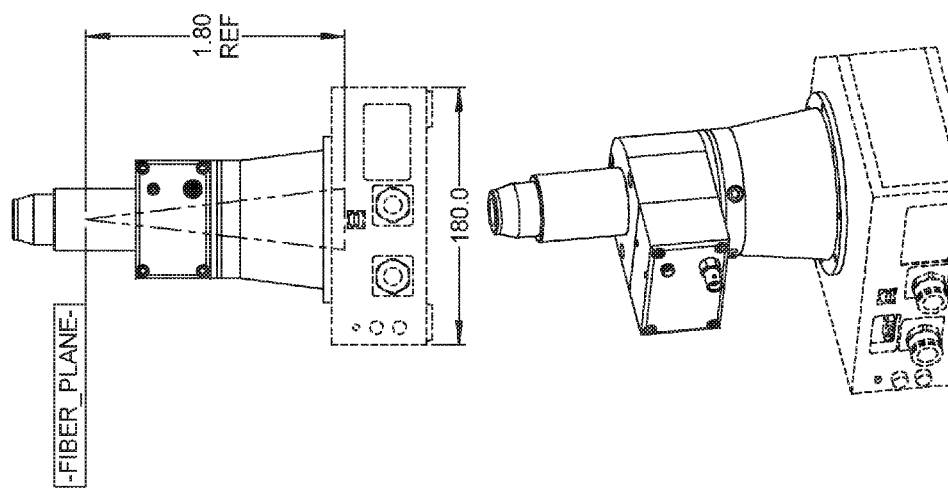

As shown in FIGS. 5A-5C, the fiber alignment system 10, according to the present teachings, has a fiber coupler 12, an alignment fixture 14, and black body absorber or power meter 47. The power meter 47 can contain beam-accepting optics that can for example be configured to accept the non-focused laser beam 20 from the fiber coupler. The power meter 47 further can have a control 61 that is configured to supply inert gas into the power meter 47 as well as water-cooling 52. The power meter 47 is coupled to the alignment fixture 14 and fiber coupling alignment system 10 to maximize the output of the alignment system 10.

As described above, the alignment fixture 14 can define a cone defining a through aperture that accepts a first portion of a collimated beam. The cone can have a first concave conical surface annularly disposed at a first angle about the aperture and a second inner convex conical surface disposed at a second angle. Optionally, the aperture can be defined by a third conical convex surface having an angle that generally corresponds to a desired beam radius for a given position along the beam axis.

In practice, a laser is adjustably coupled with a first end 62 of a fiber optic cable 80. An alignment detector 60 is placed at a second end of the fiber optic cable 82. A first portion of collimated light transmitted through the fiber optic cable is passed through an aperture defined by the alignment detector and into the power meter 47. A second portion of the collimated light is reflected off of the first conical surface and is reflected within the alignment detector 60. At least a portion of this second portion of collimated light is accepted by the optical detector positioned within the alignment detector. This second portion of reflected light corresponds to light caused by misalignment of the laser with the first end 62. The optical sensor within the alignment detector 60 produces a signal indicative of the second portion of collimated light. The alignment of the laser with the first end of the fiber 62 is then adjusted to minimize the second portion of collimated light by minimizing the output signal from the optical detector.

The power meter can have focusing optics 18 that function to safely accept the output of the fiber and to measure to potential output of the aligned system. Once the fiber has been aligned with the laser, further alignment is not required to for instance service the laser processing head. The fiber to laser alignment can, for instance during routine system maintenance be accomplished using the alignment detector 60. The alignment tool can as shown in FIG. 1-4C be incorporated between the laser processing head and the fiber, of can simply removed prior to coupling the head to the tool (see FIGS. 5A-5C).

The alignment fixture 14 has a plurality of mechanisms that allow the adjustable coupling of the alignment fixture 14 to the power meter 16. The mechanism includes an aperture plate 44, space blocks 46, 48, and an adapter block 50. It is envisioned dimensional adjustment can occur by adjusting X-Y-Z parameters of the fiber core with respect to the aligned apertures.

Although not shown in this view, the alignment fixture 14 has a conical aperture member 56. The conical aperture member 56 defines a bore therethrough. The bore can be tapered on a first side so as to have an angle of inclination substantially equal to the divergence angle of the conical aperture member 56. The conical aperture member 56 has a tip portion 65 that defines a circular interface between the first side and an angled second side, 63 that reflects the laser beam when the beam is misaligned.

The aperture is configured so as that when the beam is properly aligned, the conical aperture member will define an air gap between the beam and any internal or external surface. The alignment system 10 is used to align the laser beam with the through aperture of the alignment fixture 14 and power meter 47. When the originally misaligned beam is turned on, the dispersed beam engages the conical aperture member 56. Light from the non-aligned beam is reflected around the interior of the housing 32. The reflected beam passes through the filter 38 and housing detection aperture 36. At this point an optical detector determines how much of the beam has been misaligned. An operator can use setscrews to adjust the position of the laser with respect to the input of the fiber so as to adjust the position of the laser beam with respect to the reflective cone 56 to minimize the amount of light not passing through the reflective cone 56.

It is envisioned the adjustment of the beam location can be done automatically using actuators such as stepper motors, or manually controlled by a controller (not shown). Once the beam is aligned, the laser head 16 can be removed, repaired and replaced without realignment of the beam.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term controller. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The term code, as used above, may include software, firmware, and/or microcode, and may refer to programs, routines, functions, classes, and/or objects. The term-shared processor encompasses a single processor that executes some or all code from multiple modules. The term group processor encompasses a processor that, in combination with additional processors, executes some or all code from one or more modules. The term-shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A fiber alignment system for aligning the coupling of a laser producing a beam to a fiber cable, the system comprising:
    a laser coupled to a first end of a fiber optic cable;
    fiber coupler coupled to a second end of the fiber optic cable, the coupler defining a fiber coupling through aperture; and
    an alignment fixture having an interior chamber and a light detector configured to detect reflected light within the chamber and defining a second through aperture aligned with the fiber coupling through aperture, the alignment fixture, and an iris aligned with the second through aperture, wherein the light detector is configured to detect light not passing through the second through aperture caused by misalignment of the laser with the first end of the fiber optic cable.

2. The fiber optic alignment system according to claim 1, wherein the iris comprises a cone having an exterior concave conical surface and an internal convex conical surface.

3. The fiber optic alignment system according to claim 2, wherein the iris comprises a circular rim aligned with the fiber coupling through aperture.

4. The fiber optic alignment system according to claim 2 wherein the iris defines a bore having tapered on an angle of inclination substantially equal to the divergence angle of the laser beam.

5. The fiber optic alignment system according to claim 2 wherein the iris has a tip portion that defines a circular interface between the exterior concave conical surface and the internal convex conical surface.

6. The fiber optic alignment system according to claim 1 wherein the iris is configured so as that when the beam is properly aligned, the iris defines an air gap between the beam and any internal or external conical surfaces.

7. The fiber optic alignment system according to claim 1 further comprising one of a power meter and a fiber cut head coupled to the alignment fixture.

8. The fiber optic alignment system according to claim 1 wherein light from a non-aligned portion of the beam is reflected within the chamber.

9. The fiber optic alignment system according to claim 8 wherein the light from a non-aligned portion of the beam passes through a filter and a second aperture defined in the alignment fixture.

10. The fiber optic alignment system according to claim 9, wherein the light detector produces a signal indicative of a beam misalignment.

11. A fiber alignment system for coupling an optical fiber to a laser, the system comprising:
    a laser producing a collimated beam adjustably coupled to a first end of a fiber optic cable;
    an alignment fixture coupled to a second end of the fiber optic cable, the alignment fixture defining a chamber defining a through aperture aligned with the fiber, the alignment fixture having a light detector configured to detect reflected light within the chamber caused by misalignment of a laser beam passing through the through aperture, and an internal iris aligned with the through aperture.

12. The fiber optic alignment system according to claim 11, wherein the iris comprises a cone having an exterior convex conical surface.

13. The fiber optic alignment system according to claim 12, wherein the iris comprises an interior concave conical surface.

14. The fiber optic alignment system according to claim 12 wherein the iris has a tapered surface on a first interior side having an angle of inclination substantially equal to a beam divergence angle.

15. The fiber optic alignment system according to claim 14 wherein the iris has a tip portion that defines a circular interface between an interior concave surface defined by the cone and the exterior convex surface.

16. The fiber optic alignment system according to claim 15 wherein the aperture is configured so as that when the beam is properly aligned, iris defines an air gap between the beam and the interior concave surface.

17. The fiber optic alignment system according to claim 11 further comprising a power meter coupled to the alignment fixture.

18. The fiber optic alignment system according to claim 11 wherein light from the non-aligned portion of the beam is reflected around an interior surface of the alignment fixture.

19. The fiber optic alignment system according to claim 18 wherein the reflected beam passes through a filter and an aperture defined in the housing.

20. The fiber optic alignment system according to claim 19, wherein the light detector produces a signal indicative of a beam misalignment.

* * * * *